United States Patent [19]

van Broekhoven et al.

[11] Patent Number: 4,855,400
[45] Date of Patent: Aug. 8, 1989

[54] REMOVAL OF CATALYST RESIDUES FROM CARBON MONOXIDE/OLEFIN POLYMERS WITH CATALYST COMPLEXING AGENT

[75] Inventors: Johannes A. M. van Broekhoven; Michael J. Doyle, both of Amsterdam, Netherlands

[73] Assignee: Shell Oil Company, Houston, Tex.

[21] Appl. No.: 166,296

[22] Filed: Mar. 10, 1988

Related U.S. Application Data

[63] Continuation-in-part of Ser. No. 935,429, Nov. 26, 1986, Pat. No. 4,786,716.

[30] Foreign Application Priority Data

Nov. 26, 1985 [NL] Netherlands ............... 8503258
Mar. 13, 1987 [NL] Netherlands ............... 8700604

[51] Int. Cl.$^4$ .............................................. C08G 67/02
[52] U.S. Cl. ..................................... 528/392; 528/485; 528/486; 528/487; 528/492; 528/493; 528/495
[58] Field of Search ............... 528/392, 485, 486, 487, 528/492, 493, 495

[56] References Cited

U.S. PATENT DOCUMENTS

| | | | |
|---|---|---|---|
| 3,689,460 | 9/1972 | Nozaki | 260/63 CQ |
| 3,694,412 | 9/1972 | Nozaki | 260/63 CQ |
| 3,835,123 | 9/1974 | Nozaki | 260/94.9 B |
| 3,914,391 | 10/1975 | Nozaki | 423/364 |
| 4,076,911 | 2/1978 | Fenton | 526/11.1 |
| 4,740,625 | 4/1988 | Drent | 528/392 |

FOREIGN PATENT DOCUMENTS

| | | |
|---|---|---|
| 121965 | 10/1984 | European Pat. Off. . |
| 2046968 | 9/1968 | Japan . |
| 4048406 | 3/1969 | Japan . |
| 1081304 | 8/1967 | United Kingdom . |

OTHER PUBLICATIONS

J. Am. Chem. Soc., 1982, 104, 3520-2.
Organometallics, 1984, 3, 866-70.
Proc. Ind. Assoc. Cult. Sci., 1985, 68B, 1-5.
ChemTech, 1986, 1, 48-51.
Adv. Polym. Sci., 1986, 73-4, 125-44.
Polym. Lett., 1965, 703-7.
J. Mol. Catal., 1983, 18, 117-25.
Chim. Ind., 1971, 53, 939-40.
J. Organomet. Chem., 1985, 279, C5-C10.
Tetrahedron Lett., 1971, 26, 2409-12.

*Primary Examiner*—Harold D. Anderson
*Attorney, Agent, or Firm*—Dean F. Vance

[57] ABSTRACT

A linear alternating polymer of carbon monoxide and at least one ethylenically unsaturated hydrocarbon having enhanced purity is produced by contacting the polymer, subsequent to polymerization but prior to recovery from the polymerization mixture, with a complexing agent for palladium.

15 Claims, No Drawings

REMOVAL OF CATALYST RESIDUES FROM CARBON MONOXIDE/OLEFIN POLYMERS WITH CATALYST COMPLEXING AGENT

This is a continuation-in-part of application Ser. No. 935,429, filed Nov. 26, 1986, now U.S. Pat. No. 4,786,716.

FIELD OF THE INVENTION

This invention relates to a process for preparing linear alternating polymers of carbon monoxide and at least one ethylenically unsaturated hydrocarbon, which polymers are obtained in enhanced purity. More particularly, it relates to a process of reducing the catalyst residues present in recovered polymers of carbon monoxide and at least one ethylenically unsaturated hydrocarbon.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical catalysts, e.g., peroxy compounds. U.K. No. 1,081,304 produced similar polymers of higher carbon monoxide content in the presence of alkylphosphine complexes of palladium salts as catalyst. Nozaki extended this process through the use of arylphosphine complexes of palladium salts and certain inert solvents, e.g., U.S. Pat. No. 3,694,412.

More recently, the class of linear alternating polymers of carbon monoxide and at least one ethylenically unsaturated hydrocarbon, which polymers are also known as polyketones or polyketone polymers, has become of greater interest because of the greater availability of the polymers. More recent processes for the production of such polyketones are illustrated by published European Patent Applications Nos. 0,121,965 and 0,181,014 and copending U.S. patent application Ser. No. 930,468, filed Nov. 14, 1986. The process generally involves the use of a catalyst composition formed from a compound of the Group VIII metals palladium, cobalt or nickel, the anion of a non-hydrohalogenic acid having a pKa less than about 6, frequently less than about 2, and a bidentate ligand of phosphorus, arsenic or antimony. Although the scope of the polymerization process is extensive, it is frequently preferred to use a catalyst composition formed from palladium acetate, the anion of trifluoroacetic acid or p-toluenesulfonic acid and a bidentate phosphorus ligand selected from 1,3-bis(diphenylphosphino)propane and 1,3-bis[di(2-alkoxyphenyl)-phosphino]propane.

The polyketone polymers are represented by the formula —CO—(A)— wherein A is the moiety of ethylenically unsaturated hydrocarbon polymerized through the ethylenic unsaturation. For example, when the ethylenically unsaturated hydrocarbon is ethylene, the polymer is represented by the formula —CO—(CH$_2$—CH$_2$)—.

The polymerization process is typically conducted in a liquid phase in a diluent in which the catalyst composition components are soluble but in which the polymer product is insoluble. The insoluble polymer will typically contain residues of the catalyst that could interfere with subsequent processing of the polymer, particularly melt processing at elevated temperature. It would be of advantage to provide a method of recovering polymer having reduced quantities of catalyst residue and therefore higher polymer purity.

SUMMARY OF THE INVENTION

This invention contemplates the preparation of polyketone polymers of enhanced purity because in part of a reduced content of catalyst residues. More particularly, the invention relates to an improvement in the purity of recovered polymers of carbon monoxide and at least one ethylenically unsaturated hydrocarbon, which polymers are prepared in the presence of a palladium catalyst composition, preferably formed from a palladium compound, the anion of a non-hydrohalogenic acid having a pKa less than about 6 and an organic ligand of specified structure. The process of the invention contacts the polymer, subsequent to its production but prior to its recovery from the polymerization mixture, with a complexing agent for palladium in an amount effective to reduce palladium compound catalyst residues.

DESCRIPTION OF THE INVENTION

The polymers which are produced according to the invention are linear alternating polymers of carbon monoxide and at least one ethylenically unsaturated hydrocarbon. Suitable ethylenically unsaturated hydrocarbons for use as precursors of the polyketones have from 2 to 20 carbon atoms, preferably up to 10 carbon atoms, and are aliphatic such as ethylene and other α-olefins including propylene, 1-butene, 1-hexene and 1-dodecene, or are arylaliphatic containing an aryl group as a substituent on an otherwise aliphatic molecule, particularly an aryl substituent on a carbon atom of the ethylenic unsaturation. Illustrative of this latter class of ethylenically unsaturated hydrocarbons are styrene, m-methylsytrene, p-ethylstyrene and p-methylstyrene. Preferred polyketone polymers are copolymers of carbon monoxide and ethylene or terpolymers of carbon monoxide, ethylene and a second ethylenically unsaturated hydrocarbon of 3 or more carbon atoms, particularly an α-olefin such as propylene.

When terpolymers of carbon monoxide, ethylene and a second hydrocarbon are produced, there will be at least 2 units incorporating a moiety of ethylene for each unit incorporating a moiety of the second hydrocarbon, preferably from about 10 units to about 100 units incorporating a moiety of ethylene per unit incorporating a moiety of the second hydrocrbon. The polymer chain is therefore represented by the formula

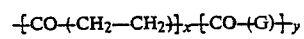

where G is the moiety obtained by polymerization of the second hydrocarbon through the ethylenic unsaturation. The —CO—(CH$_2$—CH$_2$)— units and the —CO—(G)— units are formed randomly throughout the polymer chain and the ratio of y:x is no more than about 0.5. In the modification where copolymers of carbon monoxide and ethylene are produced without the presence of a second hydrocarbon, the polymers are represented by the above formula wherein y=0. When y is other than 0, i.e., terpolymers are produced, ratios of y:x from about 0.01 to about 0.1 are preferred. The end groups or "caps" of the polymer chain will depend upon what materials are present during the polymerization and whether and how the polymer is purified. The precise nature of the end groups is of little significance so far as the overall properties of the polymer is concerned so that the polymer is fairly represented by the polymer chain as depicted above.

Of particular interest are the polymers of molecular weight from about 1,000 to about 200,000, particularly those of molecular weight from abut 10,000 to about 50,000 containing substantially equimolar quantities of carbon monoxide and ethylenically unsaturated hydrocarbon. The physical properties of the polymer will depend in part on the molecular weight of the polymer, whether the polymer is a copolymer or a terpolymer and the relative proportion of the second hydrocarbon present in any terpolymer. Typical melting points of such polymers are from about 175° C. to about 280° C., more frequently from abut 210° C. to about 270° C.

The polymers are prepared in the presence of a palladium catalyst composition. Palladium catalyst compositions that are suitable for use in the polymer preparation of the invention include $Pd(CN)_2$, $HPd(CN)_3$, $[(C_4H_9)_3P]_2PdCl_2$, $[(C_6H_5)_3P]_2PdCl_2$, $\pi$-allyl$[(C_6H_5)_3P]_2PdCl$ and $[(C_6H_5)_3P]_4Pd$. Preferably, the palladium catalyst composition for use in the invention is formed from a palladium compound, the anion of a non-hydrohalogenic acid having a pKa below about 6, preferably below about 2 and an organic ligand comprising at least one element selected from the group consisting of phosphorus, arsenic, antimony and nitrogen. The palladium compounds useful as catalyst composition components are palladium salts of organic carboxylic acids, particularly monocarboxylic acids, of up to 12 carbon atoms. Preferred palladium salts are palladium alkanoates such as palladium acetate, palladium propionate, palladium butyrate, palladium octanoate and palladium dodecanoate. Palladium acetate is a particularly preferred palladium compound.

The non-hydrohalogenic acid the anion of which is employed as a catalyst composition component is an oxygen-containing acid and is illustrated by inorganic acids such as sulfuric acid, phosphoric acid, nitrous acid and perchloric acid as well as by organic acids including organic carboxylic acids such as trifluoroacetic acid, difluoroacetic acid, trichloroacetic acid, 2,5-dihydroxybenzoic acid and dichloroacetic acid, and the organic sulfonic acids such as methanesulfonic acid, trifluoromethanesulfonic acid and p-toluenesulfonic acid. A preferred class of anions for use as a catalyst composition component is selected from the anions of trifluoroacetic acid and p-toluenesulfonic acid. The anion is customarily provided in a quantity of from about 0.5 equivalent to about 100 equivalents per gram atom of the palladium (as the compound), but preferably in a quantity of from abut 1 equivalent to about 50 equivalents per gram atom of palladium. The anion is typically provided as the free acid but in alternate modifications the anion is provided as the salt of a non-noble transition metal, such as copper, nickel, chromium, iron, vanadyl, zirconium, uranyl and cerium salts and main group metal salts, such as aluminum, tin, and antimony salts. Instead of metal salts, quaternary phosphonium salts, such as methyl triphenyl phosphonium para-tosylate, can be employed in the catalyst compositions as the anion component.

Alternatively, in the catalyst compositions, the palladium and anion components may be combined for use in a single compound. An example of such a compound is the complex $Pd(CH_3CN)_2(O_3S\text{—}C_6H_4\text{—}CH_3)_2$ which can be prepared by the reaction of palladium chloride with the silver salt of para-toluenesulfonic acid in acetonitrile as the solvent. The ligand and anion components may also be combined in a single compound. Compounds which are suitable for this purpose are sulfonic acids of the general formula

wherein $R^1$ is an organic group, particularly an aromatic group or a substituted aromatic group of up to 10 carbon atoms, wherein the substitutents are polar, and $R^2$ is a divalent hydrocarbyl bridging group of up to 10 carbon atoms having 1–4 carbon atoms in the bridge connecting the phosphorus and sulfur atom, such as 2-(diphenylphosphino)benzene sulfonic acid, 2-(diphenylphosphino)ethane sulfonic acid, and 3-(diphenylphosphino)propane sulfonic acid.

The organic ligands which are suitable in the catalyst compositions of the invention include the following:

(1) triaryl phosphines and substituted triaryl phosphines wherein the substituents are polar, such as triphenyl phosphine,
tri(2-methyl-phenyl)phosphine,
tri(2-methoxy-phenyl)phosphine, and
tri(1-naphthyl)phosphine, (2) compounds of the general formula

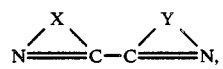

wherein X and Y are the same or different organic bridging groups of up to 10 carbon atoms, each having three or four atoms in the bridge connecting the double bonded carbon atom and the double bonded nitrogen atom, at least two of which atoms are carbon atoms, such as 2,2'-bipyridine, (4,4'-dimethyl)-2,2'-bipyridine, 4,7-dimethyl-1,10-phenanthroline, and 1,10-phenanthroline, (3) organic phosphine compounds having one phosphorus atom and at least one nitrogen atom without attached hydrogen, which nitrogen atom is connected to the phosphorus atom via an organic bridging group having at least one carbon atom in the bridge, such as
2-cyano-ethyl diphenyl phosphine,
tris(2-cyano-ethyl)phosphine,
2-pyridyl diphenyl phosphine,
bis(2-pyridyl)phenyl phosphine, and
3-(diphenyl-phosphino)-N,N-dimethyl-propionamide, (4) compounds of the general formula

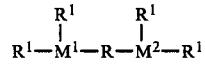

wherein $M^1$ is arsenic or antimony, $M^2$ is an element with an atomic number lower than that of $M^1$ and selected from the group consisting of arsenic, phosphorus and nitrogen, $R^1$ has the meaning given before and R is a divalent hydrocarbyl bridging group of up to 10 carbon atoms, having 2–4 atoms in the bridge connecting $M^1$ and $M^2$, such as
1-diphenylphosphino),3-(diphenylarsino)propane,
1-diphenylphosphino),3-diphenylstibino)propane,
1-(diphenylarsino),3-(dimethylamino)propane, and
1-(diphenylphosphino),2-diphenyl-arsino)ethane, (5) compounds of the general formula

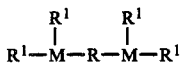

wherein M is an element chosen from the group made up of phosphorus, arsenic and antimony, and wherein $R^1$ and R have the meanings given before, such as 1,3-bis(diphenylarsino)propane,
1,3-bis(diphenylphosphino)propane,
1,4-bis(diphenylphosphino)butane,
1,2-bis(diphenylphosphino)ethane,
1,3-bis[di(4-methoxyphenyl)phosphino]propane,
2-methyl-2-(methyldiphenyl-phosphino)-1,3-bis(diphenylphosphino)propane and
N,N,N',N'-tetrakis(diphenylphosphinomethyl)ethylene diamine.

Preferably, the organic ligand employed in the process of the invention is a bidentate phosphorus ligand having two phosphorus atoms joined by a divalent hydrocarbyl bridging group, each of which phosphorus atoms also has two organic substituents which are preferably aromatic groups. Such bidentate phosphorus ligands are illustrated by the formula

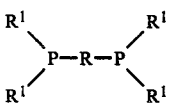

wherein $R^1$ and R have the meanings given before. Although such bidentate phosphorus ligands of a wide variety are useful catalyst composition components, the preferred bidentate phosphorus ligands are those of the formula wherein the $R^1$ groups are identical and are phenyl or 2-alkoxyphenyl wherein the alkyl moiety has up to 4 carbon atoms inclusive and R is trimethylene, i.e., $-CH_2-CH_2-CH_2-$. Particularly preferred are the bidentate phosphorus ligands 1,3-bis(diphenylphosphino)propane, 1,3-bis[di(2-methoxyphenyl)phosphino]propane, 1,3-bis[di(2,4-dimethoxyphenyl)phosphino]propane, 1,3-bis[di(2,6-dimethoxyphenyl)phosphino]propane and 1,3-bis[di(2,4,6-trimethylphenyl)phosphino]propane. Most preferred are the bidentate phosphorus ligands 1,3-bis(diphenylphosphines)propane and 1,3-bis[di(2-methoxyphenyl)phosphino)propane. The ligand is employed in a a quantity of from about 0.1 equivalent to about 5 equivalents per gram atom of palladium, preferably in a quantity of from about 0.5 equivalent to about 1.5 equivalent per gram atom of palladium.

There are a number of materials which may, on occasion, be employed as an additional catalyst composition component to enhance catalyst activity. Such catalyst modifiers include quinones, particularly benzoquinones, organic nitro and nitrite compounds and ethers. The use of such catalyst modifiers is not required, however.

In the production of the polyketone polymers, the amount of catalyst to be employed is sufficient to provide from about $1 \times 10^{-7}$ gram atom to about $1 \times 10^{-3}$ gram atom of palladium per mol of ethylenically unsaturated hydrocarbon to be polymerized, preferably from about $1 \times 10^{-6}$ gram atom to about $1 \times 10^{-4}$ gram atom of palladium per mol of ethylenically unsaturated hydrocarbon to be polymerized. The molar ratio of ethylenically unsaturated hydrocarbon to carbon monoxide is preferably from abut 10:1 to about 1:5, more preferably from about 5:1 to about 1:5.

The polymerization is conducted by contacting the reactants and catalyst composition under polymerization conditions of temperature and pressure. The mechanical configuration of the reactor is not material, although best results are obtained if continuous contacting is provided as by shaking or stirring. The polymerization is suitably conducted in the gaseous phase but is preferably conducted in the liquid phase in the presence of an inert diluent, particularly a lower alkanol such as methanol or ethanol. Typical reaction temperatures are from about 20° C. to about 200° C., more typically from about 30° C. to about 150° C. Reaction pressures very from about 1 bar to about 200 bar, but more frequently are from about 20 bar to about 100 bar. The polymerization typically produces a polyketone polymer which is insoluble in the media of its production. Conventionally, the polymer product is recovered by cooling the reactor, releasing the pressure and separating the polymer product as by filtration.

Although the conventional recovery scheme is quite suitable in most applications, it does have two disadvantages. The polymer product will generally contain at least some residues of the catalyst composition components which unless removed can prove troublesome during subsequent processing of the polymer since such residues can promote decomposition of the polymer during processing at elevated temperature and may even promote gel formation. Moreover, during the time of cooling of the reactor polymerization continues, although at a lower rate, and such polymerization will produce polymer of a molecular weight different from that produced during the principal polymerization period. Thus, the polymer product contains impurities in the form of catalyst residues and polymer of relatively different molecular weight.

The purity of the recovered polymer is enhanced through application of the process of the invention which serves to recover catalyst residues from the polymer and also to rapidly terminate the polymerization process without production of relatively different molecular weight polymer. In the preferred modification of the process of the invention, the polyketone polymer, subsequent to its formation but prior to its recovery from the polymerization mixture, is contacted with a complexing agent for palladium at substantially the temperature and pressure of the polymerization.

Conducting the process in this manner provides realization of two objectives. Addition of the palladium complexing agent to the polymer product mixture after polymerization but before polymer recovery serves to terminate polymerization as of the addition to avoid relatively different molecular weight polymer produced when polymerization is terminated by reactor cooling and depressurization. The addition also serves to reduce the catalyst residues in the polymer product. Contacting a recovered polymer product, recovered by conventional methods of cooling and depressurization, with a palladium complexing agent will reduce the catalyst residues in the polymer but will not avoid formation of relatively different molecular weight polymer. Thus operation of the process of the invention in this manner is generally not preferred. However, a polymer produced and recovered according to the process of the invention is suitably recontacted, if desired, with a solution of a palladium complexing agent to further reduce the catalyst residues in the recovered polymer.

In addition to recovering a polymer having a reduced palladium content, a palladium-containing solution is obtained, from which the palladium complex formed can be separated. By decomposition of the palladium complex it is possible to recover the palladium which subsequently can serve to prepare a palladium-containing composition to be used as the catalyst in the polymerization. Separation of the palladium complex from the palladium-containing solution may very suitably be carried out by contacting the solution with an ion exchanger.

Preferred complexing agents for palladium which can suitably be used in the process of the invention for reducing the palladium content of the polymers are organic compounds containing at least one element chosen from the group made up of phosphorus, arsenic, antimony and nitrogen. In addition to the compounds mentioned before under (1)–(5) as organic ligand catalyst components, all of which can be suitably used as complexing agents in the reduction of the palladium content of the polymers of the invention, organic amine compounds, preferably hydrocarbyl amines such as alphatic and aromatic amine compounds, for example triethyl amine, naphthyl amine, aniline, pyridine, ethylene diamine and ethylene diamine tetraacetic acid, are also eligible for the purpose. Other complexing agents for palladium which can very suitably be used in the process of the invention are alkali metal salts of organic compounds such as carboxylates, preferably acetates, cyanides, thiocyanates and acetylacetonates. Very favorable results have been obtained by using a compound chosen from the group made up of triaryl phosphines, such as triphenyl phosphine, trialkyl amines, such as triethyl amine, and acetates, such as sodium acetate, as the complexing agents for reducing the palladium content of the polymers.

Although other palladium complexing agents could be employed to produce many or most of the advantages provided by the process of the invention, it is preferred to use as the complexing agent the organic ligand employed in the polymerization process, in part to minimize difficulty in any recovery and recycling of the catalyst composition components. Thus, if the polymerization catalyst is formed in part from 1,3-bis(diphenylphosphino)propane, it is preferred to employ the same ligand as the palladium complexing agent in practicing the process of the invention to obtain recovered polyketone polymer of enhanced purity. The process of the invention employs complexing agent in an amount effective to reduce palladium compound catalyst residues, preferably in a quantity of at least about 0.25 mol of complexing agent per gram atom of palladium present in the polymer but more preferably in a quantity of at least about 0.5 mole of complexing agent and even more preferably at least about 1 mole of complexing agent per mol of palladium present in the polymer. Use of more than about 3 mol of complexing agent per gram atom of palladium present in the polymer is satisfactory but appears to offer no further advantage. Expressed differently, and assuming a polymerization allowed to go to completion, the polymer will be contacted with at least about $4 \times 10^{-8}$ equivalent of complexing agent per mole of hydrocarbon polymerized up to about $1 \times 10^{-3}$ equivalent of complexing agent per mole of hydrocarbon to be polymerized. The complexing agent is customarily added as a solution in a liquid diluent in which the complexing agent is soluble but the polymer is not. Suitable diluents include the lower alkanols such as methanol and ethanol and carboxylic compounds such as acetone and methyl ethyl ketone.

In practice, when the polyketone polymerization has been completed through contact with the catalyst composition under polymerization conditions of temperature and pressure, the complexing agent is added to the polymer product mixture at the temperature and pressure of the polymerization. After a short time, generally less than 1 hour, typically less than 30 minutes, during which the complexing agent and the polymer product mixture are intimately contacted, the reactor is cooled and depressurized and the polymer recovered by conventional methods such as filtration or decantation. The polymer product thereby obtained is of a purity greater than would have been obtained without treatment by the process of the invention because of reduced content of the catalyst composition components in the polymer and by a reduction in polymer of relatively different molecular weight.

The polyketone polymer which results from practice of the process of the invention is a premium thermoplastic having broadly established utility but particularly useful in applications where the polymer is to be processed at elevated temperatures, e.g., melt processing, where a lessened tendency to decompose is observed because of the reduced catalyst composition residues in the polymer. Such applications include the production of containers for food and drink, typically produced by thermoforming of a thin polymer sheet, and the production of shaped parts for the automotive industry, typically produced by injection molding. The polymer products are useful as such or are mixed with conventional additives such as stabilizers, anti-oxidants, fillers, reinforcements, fire retardants or mold release agents or are blended with other polymers to produce polymer compositions of modified properties.

The invention is further illustrated by the following Comparative Examples (not of the invention) and Illustrative Embodiments which should not be construed as limiting.

COMPARATIVE EXAMPLE 1

A carbon monoxide/ethylene copolymer was prepared as follows. 200 ml Methanol was introduced into a mechanically stirred autoclave of 300 ml capacity. The air present in the autoclave was expelled by pressurizing the autoclave with carbon monoxide until a pressure of 50 bar was reached, then releasing the pressure and repeating this treatment twice. After the contents of the autoclave had been brought to 85° C., a 1:1 carbon monoxide/ethylene mixture was introduced under pressure until a pressure of 55 bar was reached. Subsequently a catalyst solution was introduced into the autoclave, consisting of:

12 ml methanol,
0.02 mmol palladium acetate,
0.02 mmol 2-methyl-2(methyldiphenylphosphino)-1,3-bis(diphenylphosphino)propane and
0.04 mmol para-toluenesulfonic acid. The pressure was maintained at 55 bar by introducing under pressure a 1:1 carbon monoxide/ethylene mixture. After 2 hours the polymerization was stopped by cooling the reaction mixture down to room temperature and releasing the pressure. The copolymer was filtered off, washed with 200 ml methanol and dried at 70° C. 21 g Copolymer with a palladium content of 95 ppmw was obtained, which means that 94% of the palladium present in the catalyst had remained behind in the copolymer.

ILLUSTRATIVE EMBODIMENT 1

A carbon monoxide/ethylene copolymer was prepared in substantially the same way as in Example 1, except that the polymerization was terminated after 2 hours by pumping into the autoclave a solution of 0.04 mmol 2-methyl-2-(methyl-diphenylphosphino)-1,3-bis(-diphenylphosphino)propane in 10 ml of methanol. After the temperature had been brought down to room temperature and the pressure had been released, the copolymer was filtered off (yield: 150 ml of filtrate), washed with 200 ml of methanol and dried at 70° C. 21 g Copolymer having a palladium content of 37 ppmw was obtained, which means that only 37% of the palladium present in the catalyst had remained behind in the copolymer.

The 150 ml of filtrate obtained from the filtration of the copolymer was then re-introduced into the autoclave. In this case the air present in the autoclave was now expelled. Therefore, the autoclave contained 1 bar of air. After the contents of the autoclave had been brought to 85° C., a 1:1 carbon monoxide/ethylene mixture was introudced under pressure until a pressure of 55 bar was reached. The pressure was maintained at 55 bar by introducing under pressure a 1:1 carbon monoxide/ethylene mixture. It was observed that in the course of one hour the rate of polymerization went up from 0 to 4.5 g/hour. This latter value corresponds with the original activity of the palladium catalyst. After some time the activity gradually disappeared, which was caused by the excess of oxygen present in the autoclave in relation to phosphine (150 ml of air in the autoclave contains about 30 ml of oxygen or about 1 mmol of oxygen; this is a 25-fold excess to the 0.04 mmol of phosphine that was added).

With the aid of $^{-}$C-NMR analysis it was established that the carbon monoxide/ethylene copolymers prepared according to Comparative Example 1 and Illustrative Embodiment 1 had a linear alternating structure and consisted of units of the formula $-CO(C_2H_4)-$. The copolymers had a melting point of 257° C. Comparative Example 1 falls outside the scope of the invention and has been included for comparison. Illustrative Embodiment 1 clearly demonstrates that a considerable reduction of the palladium content of the polymers can be achieved by applying the process according to the invention, and in addition, that after the process according to the invention has been applied and the treated polymer has been filtered off from the suspension, there remains a filtrate from which an active catalyst solution can in its turn be prepared in a simple way.

COMPARATIVE EXAMPLE 2

A carbon monoxide/ethylene copolymer was prepared as follows. A magnetically stirred autoclave of 250 ml capacity was charged with a catalyst solution comprising 150 ml of methanol,
0.01 mmol of $Pd(CH_3CN)_2(O_3S-C_6H_4-CH_3)_2$, and
0.15 mmol of N,N,N',N'-tetrakis(diphenyl-phosphino-methyl)ethylene diamine.

After air present in the autoclave was removed by evacuation, the contents of the autoclave were brought to 84° C., and ethylene was introduced until a pressure of 22.5 bar was reached, followed by carbon monoxide until a pressure of 45 bar was reached. After 2.5 hours the polymerization was terminated by cooling to room temperature and then releasing the pressure. The polymer formed was filtered off, washed with methanol and dried in vacuo at room temperature. The yield was 7.7 g of copolymer having a palladium content of 1100 ppmw, which means that 80% of the palladium present in the catalyst had remained behind in the polymer.

COMPARATIVE EXAMPLE 3

A carbon monoxide/ethylene copolymer was prepared as follows. A mechanically stirred autoclave of 300 ml capacity was charged with 200 ml methanol. Air present in the autoclave was removed therefrom by pressurizing the autoclave with carbon monoxide until a pressure of 50 bar was reached, then releasing the pressure and repeating this procedure twice over. After the contents of the autoclave had been brought to 85° C., a 1:1 carbon monoxide/ethylene mixture was introduced until a pressure of 55 bar was reached. Next, the autoclave was charged with a catalyst solution comprising 6 ml of methanol,
0.01 mmol of palladium acetate,
0.01 mmol of 2-methyl-2-(methyl-diphenyl-phosphino)-1,3-bis(diphenyl-phosphino)propane, and 0.01 mmol of trifluoromethane sulfonic acid.

The pressure was kept at 55 bar by the introduction of a 1:1 carbon monoxide/ethylene mixture. After 3 hours, the polymerization was terminated by cooling the reaction mixture to room temperature and releasing the pressure. The copolymer was filtered off, washed with 200 ml methanol and dried at 70° C. The yield was 18.5 g copolymer having a palladium content of 42 ppmw, which means that 81% of the palladium present in the catalyst had remained behind in the copolymer.

COMPARATIVE EXAMPLE 4

A carbon monoxide/ethylene copolymer was prepared as follows. A mechanically stirred autoclave of 250 ml capacity was charged with a catalyst solution comprising 50 ml of methanol,
0.01 mmol of palladium acetate,
0.15 mmol of ortho-(diphenyl-phosphino)benzene sulfonic acid.

After air present in the autoclave was removed by evacuation, ethylene was introduced until a pressure of 20 bar was reached, followed by carbon monoxide until a pressure of 40 bar was reached. Then, the contents of the autoclave were brought to 80° C. After 5 hours, the polymerization was terminated by cooling to room temperature and then releasing the pressure. The polymer formed was filtered off, washed with methanol and dried at room temperature. The yield was 4.5 g copolymer having a palladium content of 1770 ppmw, which means that 75% of the palladium present in the catalyst had remained behind in the copolymer.

COMPARATIVE EXAMPLE 5

A carbon monoxide/ethylene/propylene terpolymer was prepared as follows. A mechanically stirred autoclave of 300 ml capacity was charged with 200 ml methanol. Air present in the autoclave was expelled therefrom by pressurizing the autoclave with carbon monoxide until a pressure of 50 bar was reached and then releasing the pressure, and repeating this treatment twice over. After the contents of the autoclave had been brought to 85° C., carbon monoxide was introduced until a pressure of 30 bar was reached, followed by propylene, until a pressure of 40 bar was reached and finally ethylene, until a pressure of 56 bar was reached. Then the autoclave was charged with a catalyst solution comprising 4.5 ml of methanol,
1.5 ml of toluene,
0.01 mmol of palladium acetate,
0.012 mmol of 1,3-bis[di(2-methoxy-phenyl)phosphino]propane, and
0.2 mmol of trifluoroacetic acid.

The pressure was kept at 56 bar by introducing a 1:1 carbon monoxide/ethylene mixture. After 4 hours, the polymerization was terminated by cooling the reaction mixture to room temperature and releasing the pressure. The terpolymer was filtered off, washed with 200 ml methanol and dried at 70° C. The yield was 29 g terpolymer having a palladium content of 24 ppmw, whichmeans that 67% of the palladium present in the catalyst had remained behind in the terpolymer.

ILLUSTRATIVE EMBODIMENT 2

A carbon monoxide/ethylene copolymer was prepared substantially in the same way as the copolymer of Comparative Example 3 except that the polymerization was terminated after 3 hours by pumping a solution of 0.02 mmol of triethylamine in 6 ml methanol into the autoclave. After cooling to room temperature and releasing the pressure, the copolymer was filtered off, washed with 200 ml methanol and dried at 70° C. The yield was 20 g copolymer having a palladium content of 22 ppmw, which means that 42% of the palladium present in the catalyst had remained behind in the copolymer.

ILLUSTRATIVE EMBODIMENT 3

A carbon monoxide/ethylene/propylene terpolymer was prepared substantially in the same way as the terpolymer of Comparative Example 5, except that now the polymerization was terminated after 3 hours by pumping a solution of 0.08 mmol of triphenyl phosphine in 6 ml methanol into the autoclave. After cooling to room temperature and releasing the pressure, the terpolymer was filtered off, washed with 200 ml methanol and dried at 70° C. The yield was 20 g terpolymer having a palladium content of 10 ppmw, which means that 20% of the palladium present in the catalyst had remained behind in the terpolymer.

ILLUSTRATIVE EMBODIMENT 4

A carbon monoxide/ethylene/propylene terpolymer was prepared substantially in the same way as the terpolymer of Illustrative Embodiment 3, the difference being that the polymerization was terminated after 2.5 hours, by pumping a solution of 0.14 mmol of triethylamine in 6 ml of methanol into the autoclave. The yield was 8.8 g of terpolymer having a palladium content of 52 ppmw, which means that 46% of the palladium present in the catalyst had remained behind in the terpolymer.

ILLUSTRATIVE EMBODIMENT 5

A carbon monoxide/ethylene/propylene terpolymer was prepared substantially in the same way as the terpolymer of Illustrative Embodiment 3, the difference being that the polymerization was terminated after 5 hours, by pumping a solution of 7.1 ml of sodium acetate in 6 ml of methanol into the autoclave. The yield was 16.7 g of terpolymer having a palladium content of 17 ppmw, which means that 27% of the palladium present in the catalyst had remained behind in the terpolymer.

Comparative Examples 2-5 are outside the scope of the invention. They have been included in the patent application for comparison. These examples demonstrate, inter alia, that if the present polymers are prepared by using palladium-containing catalyst compositions, which compositions have widely different structures, this results in polymers in which a substantial portion of the palladium has remained behind. A considerable reduction of the palladium content be achieved by contacting these polymers with a complexing agent for palladium.

Illustrative Embodiments 2-5 are in accordance with the invention. By these examples, polymers of carbon monoxide with one or more olefinically unsaturated compounds were prepared by using a palladium-containing catalyst composition, and the palladium-containing polymers thus obtained were contacted with a complexing agent for palladium, which led to a reduction of the palladium content of the polymers. The favorable influence which contacting the polymers with a complexing agent for palladium has on the percentage of palladium which remains behind in the polymers becomes apparent when the result of Illustrative Embodiment 2 (42%) is compared with that of Comparative Example 3 (81%) and when the results of Illustrative Embodiments 3-5 (20, 46 and 27%, respectively) are compared with the result of Comparative Example 5 (67%).

With the aid of $^{13}$C-NMR analysis it was established that the carbon monoxide/ethylene copolymers prepared in accordance with Comparative Examples 2-4 and Illustrative Embodiment 1 had a linear alternating structure and therefore consisted of units of the formula $—CO—(C_2H_4)—$. The copolymers had a melting point of 257° C.

It was also established with the aid of $^{13}$C-NMR analysis that the carbon monoxide/ethylene/propylene terpolymers prepared in accordance with Comparative Example 5 and Illustrative Embodiments 3-5 had a linear structure and consisted of units of the formula $—CO—(C_2H_4)—$ and units of the formula $—CO—(C_3H_6)—$, which units occurred randomly distributed within the terpolymers. The terpolymers prepared in accordance with Comparative Example 5 and Illustrative Embodiments 3-5 had a melting points of 225°, 224°, 226° and 225° C., respectively.

What is claimed is:

1. In the liquid phase process for preparing a linear alternating polymer of carbon monoxide and at least one ethylenically unsaturated hydrocarbon by contacting the carbon monoxide and hydrocarbon under polymerization conditions of temperature and pressure in the presence of an inert diluent and a catalyst composition formed from a palladium compound, an anion of a nonhydrohalogenic acid having a pKa less than about 6 and an organic ligand and recovering the polymer from the resulting product mixture, the improvement which comprises contacting the polymer subsequent to its production but prior to its recovery with at least about $4 \times 10^{-8}$ equivalents of a complexing agent for palladium per mole of hydrocarbon polymerized, therein forming a palladium-containing solution comprising said inert diluent and the resulting palladium complex, separating said palladium-containing solution from said polymer and recovering thereafter polymer of enhanced purity.

2. The process of claim 1 wherein contacting temperature and contacting pressure are substantially the temperature and pressure of polymerization.

3. The process of claim 2 wherein the complexing agent is selected from the group consisting of
(1) triaryl phosphines;
(2) compounds of the formula

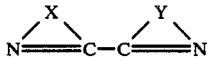

wherein X and Y independently are the same or different organic bridging groups of up to 10 carbon atoms, each having three or four carbon atoms in the bridge connecting the double bonded carbon atom and the double bonded nitrogen atom; and
(3) compounds of the formula

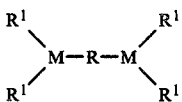

wherein M independently is selected from the group consisting of phosphorus, arsenic and antimony, $R^1$ is an aromatic group or a substituted aromatic group of up to 10 carbon atoms wherein the substituents are polar, and R is a divalent hydrocarbyl bridging group of up to 10 carbon atoms, having 2-4 atoms in the bridge connecting the M atoms.

4. The process of claim 3 wherein the complexing agent is the organic ligand used in the catalyst compositions for preparing the polymer.

5. The process of claim 4 wherein the ligand is 1,3-bis(diphenylphosphino)propane.

6. The process of claim 5 wherein the ligand is 1,3-bis[di(2-methoxyphenyl)phosphino]propane.

7. In the liquid phase process of preparing a linear alternating polymer of carbon monoxide and at least one ethylenically unsaturated hydrocarbon of the formula

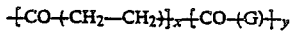

wherein G is the moiety of an α-olefin of at least 3 carbon atoms polymerized through the ethylenic unsaturation and the ratio of y:x is no more than about 0.5, by contacting carbon monoxide and the hydrocarbon under polymerization conditions of temperature and pressure with a catalyst composition formed from a palladium compound, the anion of a non-hydrohalogenic acid selected from the group consisting of sulfonic and carboxylic acids having a pKa less than about 2, and an organic ligand selected from the group consisting of (1) triarylphosphines; (2) compounds of the formula

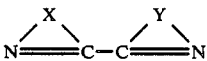

wherein X and Y are the same or different organic bridging groups of up to 10 carbon atoms, each having three or four carbon atoms in the bridge connecting the double bonded carbon atom and the double bonded nitrogen atom; and (3) compounds of the formula

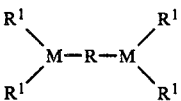

wherein M independently is selected from the group consisting of phosphorus, aresenic and antimony, $R^1$ is an aromatic group or a substituted aromatic group of up to 10 carbon atoms wherein the substituents are polar, and R is a divalent hydrocarbyl bridging group of up to 10 carbon atoms, having 2-4 atoms in bridge connecting the M atoms, in the presence of an inert diluent; and recovering the polymer from the resulting product mixture, the improvement which comprises contacting the polymer subsequent to its production but prior to its recovery with at least about $4 \times 10^{-8}$ equivalents of a complexing agent for palladium per mole of hydrocarbon polymerized, therein forming a palladium-containing solution comprising said inert diluent and the resulting palladium complex, separating said palladium-containing solution from said polymer and recovering therefrom polymer of enhanced purity.

8. The process of claim 7 wherein contacting temperature and contacting pressure are substantially the temperature and pressure of polymerization.

9. The process of claim 7 wherein the complexing agent is the organic ligand used in the catalyst composition for preparing the polymer.

10. The process of claim 9 where y is zero.

11. The process of claim 10 wherein the ligand is 1,3-bis(diphenylphosphino)propane.

12. The process of claim 8 wherein the ratio of y:x is from about 0.01 to about 0.1.

13. The process of claim 12 wherein G is the moiety of propylene.

14. The process of claim 13 wherein the ligand is 1,3-bis[di(2-methoxyphenyl)phosphino]propane.

15. The process of claim 13 wherein the ligand is 1,3-bis(diphenylphosphino)propane.

* * * * *